United States Patent
Schmitt

[11] 3,787,671
[45] Jan. 22, 1974

[54] METHOD AND APPARATUS FOR TESTING AREA NAVIGATION COMPUTERS

[75] Inventor: Jerry C. Schmitt, Overland Park, Kans.

[73] Assignee: King Radio Corporation, Olathe, Kans.

[22] Filed: Mar. 15, 1971

[21] Appl. No.: 124,299

[52] U.S. Cl..... 235/150.26, 235/150.27, 343/112 C
[51] Int. Cl............................................. G06g 7/78
[58] Field of Search............343/112 C; 235/150.26, 235/150.27

[56] References Cited
UNITED STATES PATENTS
3,581,073   5/1971   Visher........................... 235/150.26

Primary Examiner—Eugene G. Botz
Assistant Examiner—R. Stephen Dildine, Jr.
Attorney, Agent, or Firm—Scofield, Kokjer, Scofield & Lowe

[57] ABSTRACT

A method and apparatus for testing area navigation computers and systems which incorporate the use of a test switch within the computer circuit to either pass or interrupt signals which correspond to the location of the aircraft utilizing the subject area navigation computer. This switching function is accomplished prior to same being summed together with signals representative of the corresponding waypoint location. Interruption of the aircraft location signals to the summing point artificially places the aircraft over a corresponding VORTAC station. Accordingly, the output from a properly operating computer will equal the waypoint data which is normally used to manually program the computer. Additional switch means override circuitry which would normally indicate a malfunction of the DME signal used with the computer circuitry in order that the pilot's navigation displays are not rendered inoperative.

7 Claims, 1 Drawing Figure 3,787,671

METHOD AND APPARATUS FOR TESTING AREA NAVIGATION COMPUTERS

BACKGROUND AND BRIEF DESCRIPTION OF THE INVENTION

The ability to detect failures in area navigation computers is made more difficult due to the fact that a zero (0) output from the computer is a legitimate and often times proper condition. This is to be contrasted with previous VOR navigation instruments whereinthe VOR computers always have an output when operating satisfactorily therefore a failure warning mechanism could be manufactured to operate in the absence of an output. With the above-mentioned zero (0) output a legitimate condition, such as when the aircraft passes over a corresponding waypoint, the VOR type failure warning mechanism was not applicable and many area navigation computers were not supplied with adequate failure warning features.

Known area navigation computers either perform no test function at all or require the pilot to set in a particular group of navigation co-ordinates and then activate a test switch which supposedly results in the display reading a particular condition. The obvious disadvantage is in this type of testing procedure or mechanism is that the test cannot be perofrmed quickly, however, more significantly, the test cannot be performed without disturbing the co-ordinates of the current navigation problem.

My invention selectively utilizes the signal information corresponding to the aircraft location and to the waypoint location. Further, the aircraft location signal information is permitted to be interrupted prior to same being summed with the waypoint information. Interruption at this particular portion of the computer circuitry, in conjunction with the simultaneous overriding of the DME flag signal, permits the aircraft's location to be artificially placed over a corresponding VORTAC station so that a properly operating computer will have an output indicative of the waypoint data which has been manually programmed into the area navigation computer.

A primary object of the invention is to provide an area navigation computer test mechanism which is inexpensive, easy to operate, and which will encourage pilot usage of same at any time regardless of the aircraft location.

Another object of the invention is to provide a method and apparatus for testing the functional operation of area navigation computers that will permit such a test while the aircraft is still on the ground and without the corresponding functioning of distance measuring equipment (DME). It is a feature of the invention that the only signal required to perform the test is that from a VOR receiver thereby permitting the area navigation computer to be completely tested prior to flight in order to assure at least minimal navigation capabilities.

Another object of the invention is to provide a method and apparatus for testing the area navigation computers having the ability to detect most noncatastrophic failure modes within the computer which may result in subtle errors in the computer output not otherwise detectable by the pilot in conventional or prior art devices and methods.

A further object of the invention is to provide a method and apparatus for testing area navigation computers which may be easily incorporated into existing area navigation computers. It is a feature of this invention that the information needed to perform the subject test is readily available in all area navigation computers and the addition of the necessary equipment to facilitate utilization of the subject invention may be easily and simply accomplished with a minimum of expense either during the assembly and manufacture of new equipment or in modifying existing units.

Other and further objects of the invention, together with the features of novelty appurtenant thereto, will appear in the course of the following description.

DETAILED DESCRIPTION OF THE INVENTION

Figure 1:
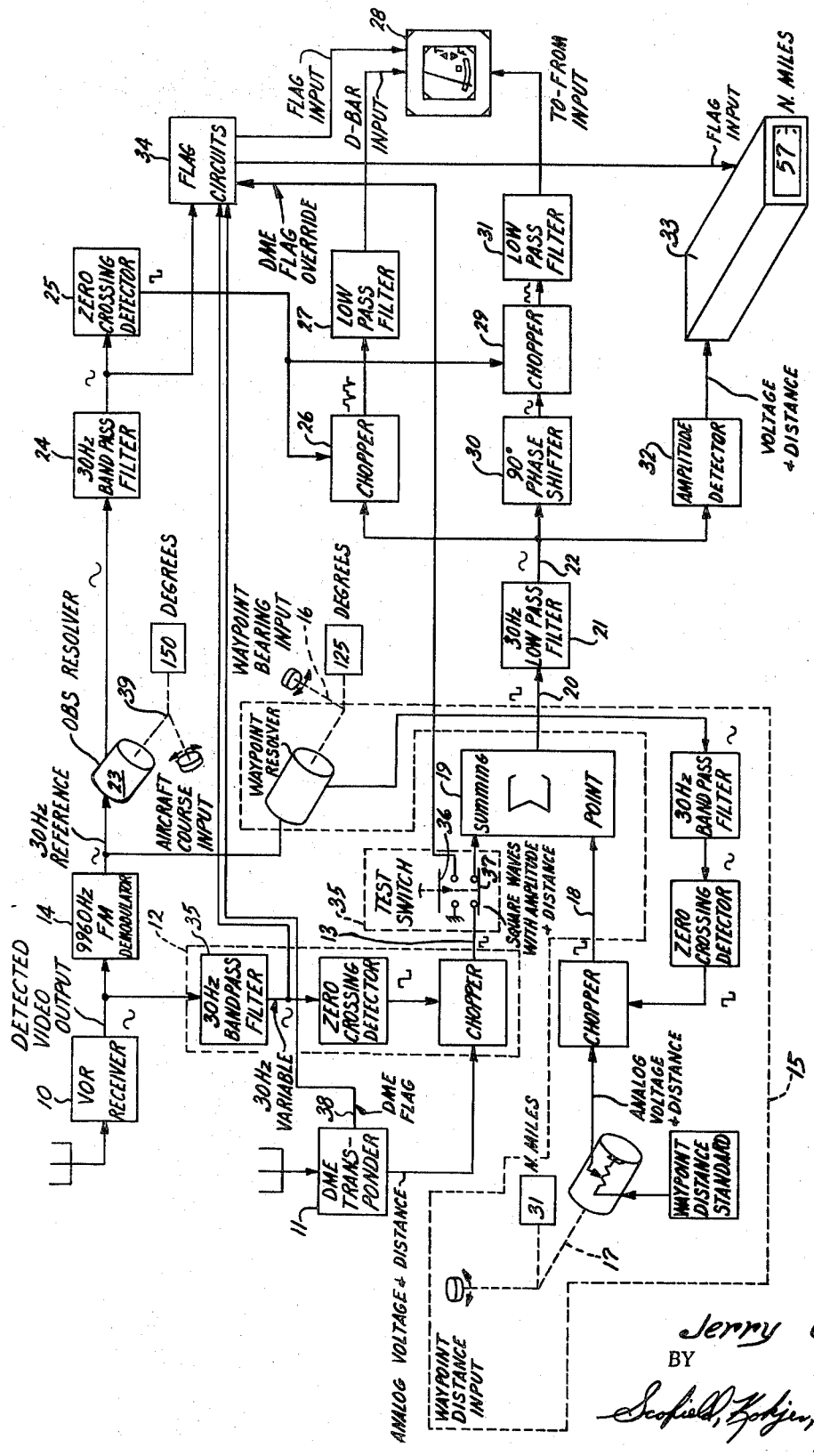

In the accompanying drawing, which forms a part of the specification and is to be read in conjunction therewith and in which like reference numerals are employed to indicate like parts in the various views:

FIG. 1 diagrammatically represents a conventional area navigation computer which obtains its external navigation information from a VOR receiver 10 and a DME 11. These conventional navigational inputs (from the VOR and the DME) determine the aircraft's location relative to a VORTAC ground station's magnetic north via the VOR bearing and the DME distance. The circuitry enclosed within the broken lines (indicated by the numeral 12) combines the conventional signal inputs and produces an output signal on line 13 which may be considered to be a vector whose phase and amplitude correspond to the aircraft bearing from the VORTAC station's magnetic north and the distance from the VORTAC to the aircraft.

The aircraft's destination, typically referred to as waypoint, is similarly located by modifying the north reference signal obtained from the VOR receiver and modulated or detected in demodulator 14 enroute to the waypoint circuitry shown as enclosed within the broken lines 15. However, it is necessary to initiate the operation of the waypoint circuitry by first rotating the north reference signal to the desired waypoint bearing from the VORTAC ground station's magnetic north. Accordingly, this is a pilot input on the waypoint resolver and mechanical linkage generally indicated by the numeral 16. The usual sequential operation then requires the pilot to set the desired VORTAC to waypoint distance by means of the combined waypoint distance potentiometer and mechanical linkage indicated by the numeral 17. This combines with the previously developed waypoint signal to produce an output on line 18 through the chopper which represents the waypoint vector from the VORTAC.

Normally, the signals representing the aircraft and the waypoint locations from the VORTAC which are present on lines 18 and 13 respectively, are summed in summing point 19 to produce a third vector signal corresponding to the distance and bearing from the aircraft to the waypoint. This vector is contained in the signal on line 20, however, other undesired signals resulting from the computing methods require that a 30 Hz low pass filter 21 be utilized to reject the undesired signals. Accordingly, the signal produced on line 22 is almost totally representative of the aircraft waypoint vector. This vector signal is then used to navigate the aircraft as will be described in more detail.

The OBS resolver 23 further facilitates navigation by providing a means by which the pilot may select the desired aircraft course. The output signal from resolver 23 is delivered to pass band filter 24 and from thence to clipper 25 to produce a square wave representing the desired aircraft course. This square wave is in turn delivered to chopper 26 which has a second input from low pass filter output, line 22, having the waypoint vector present thereon. Accordingly, chopper 26 produces an output signal representative of the aircraft positional error from the desired course. Low pass filter 27 filters this error signal and delivers same to the pilot's left-right navigational display 28.

The square wave representing the desired aircraft course from the zero crossing detector or clipper 25 is also fed to a chopper 29. A second input to chopper 29 is the aircraft waypoint vector after same has passed through a 90° phase shifter 30. The chopper output is filtered in 31 to produce a signal corresponding to the TO or FROM condition on navigational display 28.

The amplitude detector 32 likewise utilizes the output signal from low pass filter 21 appearing on line 22 for the purpose of determining the aircraft's distance from the waypoint. With this signal (the output on line 22) being delivered to amplitude detector 32 and with same having an output corresponding to a DC signal proportional to the amplitude on the signal on output line 22, the amplitude detector output is used to drive the distance display 33 thereby displaying to the pilot the aircraft distance from the waypoint in nautical miles.

The navigational computer will also contain a series of circuits which are used to determine whether the system is operating satisfactorily or not. These circuits are represented by the circuit block 34 and are used to determine the sufficiency of the receiver signal by using the output of circuitry portions from 30 Hz band pass filter 24, later described circuit portion 35 and the sufficiency of the DME signal from block 11. It may be desirable to have other inputs into the like circuits 34 as same are useful and significant in particular areas of navigation design. The outputs from the flag circuits 34 are used to display flag conditions on both the pilot's navigation display 28 and on the distance display 33.

Turning now more particularly to the circuitry shown within the dash lines 35, the normally closed switch 37 is used to interrupt the VORTAC to aircraft vector signal on line 13 when it is desired to test the operation of the area navigation computer. Interruption of this signal forces the computer to artificially place the aircraft over the VORTAC so that the output from a properly operating computer would be equal to the waypoint input (the VORTAC to waypoint distance and bearing). As suggested above, this pilot input is manually set by the utilization of the waypoint resolver 16 and the waypoint distance potentiometer 17 and the corresponding indices. Test switch 36 is a normally opened contact which is used to override the DME flag signal present on line 38 by grounding the flag circuits 34 when switch 36 is moved downwardly to close its contacts. Otherwise, the pilot's navigation display depicted by the numerals 28 and 33 would be inoperative if the DME was not operative.

Upon operation of the test switch (36 and 37), the pilot's distance display 33 will slew to whatever value waypoint distance potentiometer 17 has been set to provided that the computer is properly operating. A small variation may appear due to the error introduced in the area navigation computer. Should the computer not be operating in a satisfactory manner, or in particular should the computer have a subtle error not normally detectable, the error will be displayed as a difference between the waypoint distance which the pilot set on potentiometer 17 and the displayed distance on display 33. Further testing can also be performed by adjusting the aircraft course input resolver 39 or waypoint bearing input resolver 16 for a centered left-right deviation signal and a TO condition as would ordinarily be displayed on the TO-FROM indicator on display 28. The result of this test should be a waypoint bearing and aircraft course setting which are different by the bearing error within the area navigation computer.

The latter portion of the test requires adjusting either the aircraft course input or waypoint bearing and extends the portion of the area navigation computer tested. However most errors, including even subtle errors within the area navigation computer which would result in bearing errors determined by the second portion of test, would also result in amplitude errors which would be detected in the first portion of the test. Accordingly, the primary test will reside in the utilization of the displayed distance as mentioned above. This test will be both simple to perform and easy to understand to warrant and encourage its constant use with respect to area navigation computers.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. The method of testing the operability of an area navigation computer which computes aircraft to waypoint navigation information from pilot input data including VORTAC to waypoint distance and bearing and aircraft to waypoint course in conjunction with received VORTAC signal information relative to aircraft to VORTAC distance and bearing, said method including the steps of summing a vector signal corresponding to the VORTAC to waypoint distance and bearing with a vector signal corresponding to aircraft to VORTAC distance and bearing, displaying computed distance from aircraft to waypoint, interrupting said aircraft to VORTAC bearing and distance vector signal prior to said summing step, and displaying a distance equal to the VORTAC to waypoint distance when said computer is operating without error instead of the computed distance from said aircraft to said waypoint, said last mentioned displaying thereby providing an accuracy check of the operation of said area navigation computer.

2. The combination as in claim 3 including the step of adjusting an aircraft resolver to obtain a centered deviation bar and a TO condition, and comparing the waypoint bearing and the aircraft course setting to indicate the bearing error within said area navigation computer.

3. A combination as in claim 1 wherein said area navigation computer will include a flag circuit which operates to nullify the displaying of distance information during preselected conditions, and wherein said method includes the step of overriding portions of said nullifying flag circuits associated with the aircraft to VORTAC distance and bearing vector when said aircraft to VORTAC distance and bearing vector signal is interrupted.

4. The combination as in claim 3 including the step of adjusting an aircraft resolver to obtain a centered deviation bar and a TO condition, and comparing the waypoint bearing and the aircraft course setting to indicate the bearing error within said area navigation computer.

5. The combination as in claim 4 wherein said input resolver is a waypoint bearing resolver.

6. The method of testing the operability of an area navigation computer which computes aircraft to waypoint navigation information from pilot input data including VORTAC to waypoint distance and bearing and aircraft to waypoint course in conjunction with received VORTAC signal information relative to aircraft to VORTAC distance and bearing, said method including the steps of summing a vector signal corresponding to the VORTAC to waypoint distance and bearing, displaying computed distance from aircraft to waypoint, interrupting said aircraft to VORTAC bearing and distance vector signal prior to said summing step, and adjusting an aircraft resolver to obtain a centered deviation bar and a TO condition, and comparing the waypoint bearing and the aircraft course setting to indicate the bearing error within said area navigation computer.

7. The combination as in claim 6 wherein said aircraft resolver is a waypoint bearing input resolver.

* * * * *